(No Model.)

J. B. TIMBERLAKE.
Detachable Handles for Dishes.

No. 230,362.  Patented July 20, 1880.

Witnesses:
H. N. Low
J. S. Barker

Inventor:
John B. Timberlake
by Doubleday and Bliss
attys

UNITED STATES PATENT OFFICE.

JOHN B. TIMBERLAKE, OF JACKSON, MICHIGAN.

DETACHABLE HANDLE FOR DISHES.

SPECIFICATION forming part of Letters Patent No. 230,362, dated July 20, 1880.

Application filed June 16, 1880. (No model.)

*To all whom it may concern:*

Be it known that I, JOHN B. TIMBERLAKE, of Jackson, in the county of Jackson and State of Michigan, have invented certain new and useful Improvements in Detachable Handles for Dishes; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to an improved detachable metallic handle for vessels made of earthenware, glass, &c., which it is generally impossible to provide with permanent handles of earthenware or glass, owing to the liability of breakage and to the room necessary for shipping.

The invention consists in forming a handle by bending a single strip of elastic metal into U shape, so as to have the downwardly-projecting legs diametrically opposite to each other when attached to a vessel, and so that they shall automatically press inward against the vessel by reason of elasticity, for which latter purpose the handle is so shaped that the lower ends of the legs when detached are somewhat nearer together than the sides of the vessel to which it is to be secured.

Figure 1:
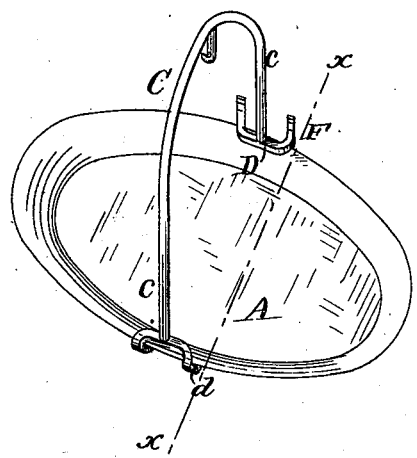
Figure 3:
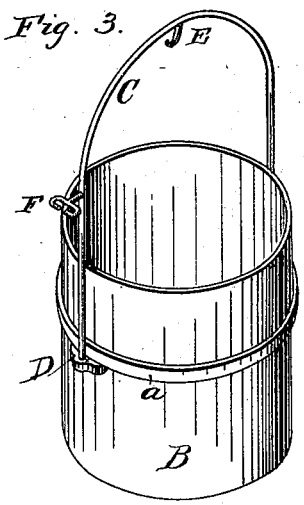
Figure 2:
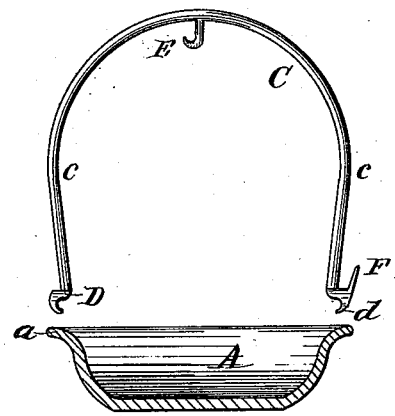
Figure 4:
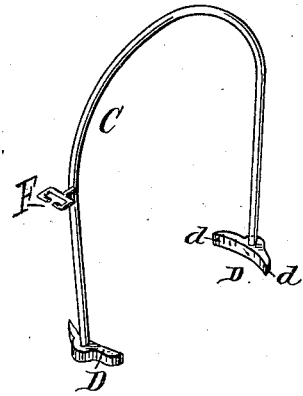

Figure 1 is a perspective, showing the method of attaching my improved handle to an oval dish. Fig. 2 is a transverse section of the dish shown in Fig. 1, taken on line *x x*, the handle being detached. Fig. 3 illustrates a method of fastening the handle to a dish having a rim below the upper edge. Fig. 4 is a perspective view of the handle shown in Fig. 3.

In the drawings, A represents a dish of oval form, and B one having a circular rim, they being respectively similar to the oval and circular dishes commonly used in great numbers.

The detachable handle which I have devised is represented by C. It is so constructed as to be readily attachable to any of these ordinary dishes of whatever shape. It consists of a strip of elastic metal (preferably brass, though other material may be used if desired) bent into U shape, the legs *c c* being arranged to be diametrically opposite to each other when the handle is attached to the vessel.

By examining Fig. 2 it will be seen that the handle is so bent or shaped that the lower ends of legs *c c* are when detached somewhat nearer together than the sides of the dish, or than said legs are when attached thereto. The elasticity of the handle when in place upon the dish should be sufficient to tend to draw the lower ends of the legs *c c* into the position shown in Fig. 2 in order to clamp the parts together as firmly as possible.

The dishes of the character described are usually formed with a bead or rim, *a*, at the upper edge, and many (such as pickle-dishes, &c.) are also formed with similar beads below the edge, as shown in Fig. 3. These beads or rims assist in holding the handle securely in place. At the lower ends of the legs *c c* horizontal bars or cross-pieces D D are attached thereto or are formed in one piece therewith. These cross-pieces carry projections *d d*, adapted to press against the sides of the dish beneath the rim or bead *a*. The projections may be curved downwardly to pass over the outer edge of the bead, as shown in Fig. 1, the cross-piece D in this case resting on the top of the bead, or they may extend laterally and inwardly from the cross-piece to grasp the vessel immediately below the bead. Preferably there are two of these projections *d* with each cross-piece D, though a greater or less number may be used if desired. Instead of separate projections, as in Figs. 1 and 2, the part D may be made of a wide bent plat arranged to grasp the bead in substantially the manner shown.

The peculiar construction of the clamping parts when combined with the inwardly-pressing elastic handle gives a firm base of support for the handle, which when attached thus cannot under ordinary circumstances be accidently separated from the dish.

As the handle will sometimes be applied to butter-dishes, it may be constructed with a pendent hook, E, at the center for holding the cover of the dish and with a rest for the knife. The knife-rest may be formed of an open catch on one of the legs of the handle, or it may consist of upwardly-projecting hooks F, attached to or formed with the cross-piece D. By attaching the parts E and F to the detachable handle they can be readily removed from the dish when it is desired to cleanse the latter or to use it for some other purpose.

I am aware that use has been heretofore made of jar-lifters constructed of bent wires so arranged that the operator can press the legs inward to grasp a jar, and so that the legs will spread apart by elasticity and escape from the jar when not pressed by the operator's hand, and I do not claim such devices; but the principle of operation of my device is exactly opposite to that of those described, for in mine the handle is arranged to press inward without assistance from the operator's hand, so that it is adapted to hold itself by elasticity upon the dish, whereas the jar-lifters heretofore used immediately escape from the jar when the operator withdraws his hand. Hence the latter are not adapted to serve the purpose that mine is—that is, to form a handle which shall be permanent in its place until removed by hand.

What I claim is—

1. The herein described detachable handle adapted to permanently support itself upon a dish, it being formed of a single piece of elastic metal bent into U form to automatically press inwardly against the sides of the dish by elasticity, and arranged to have the two legs diametrically opposite when attached, substantially as set forth.

2. A detachable handle adapted to permanently support itself upon a dish, and constructed to have two elastic legs, c c, diametrically opposite when attached, and each provided with a clamp held automatically in engagement by the elasticity of said legs, substantially as set forth.

3. The combination, in a detachable handle for dishes, of two diametrically-opposite elastic legs, c c, and two clamps constructed to bear against the upper side and the lower side of a bead formed on a dish, and arranged to be held in engagement with said bead by the elasticity of the legs, substantially as set forth.

In testimony that I claim the foregoing I have hereunto set my hand this 10th day of June, 1880.

JOHN BATEMAN TIMBERLAKE.

Witnesses:
NORBERT DESNOYER,
WILLIS KING.